United States Patent
Silvanto et al.

(10) Patent No.: US 12,183,307 B2
(45) Date of Patent: *Dec. 31, 2024

(54) ELECTRONIC DEVICE DISPLAY WITH EXTENDED ACTIVE AREA

(71) Applicant: Apple Inc., Cupertino, CA (US)

(72) Inventors: Mikael M. Silvanto, San Francisco, CA (US); Dinesh C. Mathew, San Francisco, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,814

(22) Filed: Oct. 16, 2023

(65) Prior Publication Data

US 2024/0038200 A1 Feb. 1, 2024

Related U.S. Application Data

(63) Continuation of application No. 17/971,260, filed on Oct. 21, 2022, now Pat. No. 11,823,645, which is a
(Continued)

(51) Int. Cl.
*G09G 5/14* (2006.01)
*G06F 1/16* (2006.01)
(Continued)

(52) U.S. Cl.
CPC ............. *G09G 5/14* (2013.01); *G06F 1/1605* (2013.01); *G06F 1/1686* (2013.01);
(Continued)

(58) Field of Classification Search
CPC .......... G09G 5/14; G09G 3/3208; G09G 3/36; G09G 2300/04; G06F 1/1605;
(Continued)

(56) References Cited

U.S. PATENT DOCUMENTS 5,949,408 A 9/1999 Kang et al.
6,064,361 A 5/2000 Akiyama
(Continued)

FOREIGN PATENT DOCUMENTS

CN 1540440 A 10/2004
CN 103914206 A 7/2014
(Continued)

*Primary Examiner* — Mihir K Rayan
(74) *Attorney, Agent, or Firm* — Treyz Law Group, P.C.; G. Victor Treyz; Kendall P. Woodruff

(57) ABSTRACT

An electronic device may be provided with a display. The display may be formed from liquid crystal display pixels, organic light-emitting diode pixels, or other pixels. The display may have an active area that is bordered along at least one edge by an inactive area. The active area contains pixels and displays images. The inactive area does not contain any pixels and does not display images. The inactive area may have a layer of black ink or other masking material to block internal components from view. The active area may have an opening that contains an isolated portion of the inactive area or may contain a recess into which a portion of the inactive area protrudes. An electrical component such as a speaker, camera, light-emitting diode, light sensor, or other electrical device may be mounted in the inactive area in the recess or opening of the active area.

20 Claims, 10 Drawing Sheets

Related U.S. Application Data continuation of application No. 17/710,687, filed on Mar. 31, 2022, now Pat. No. 11,521,579, which is a continuation of application No. 16/831,577, filed on Mar. 26, 2020, now Pat. No. 11,521,577, which is a continuation of application No. 15/759,054, filed as application No. PCT/US2016/048754 on Aug. 25, 2016, now Pat. No. 10,607,573.

(60) Provisional application No. 62/233,923, filed on Sep. 28, 2015.

(51) Int. Cl.
*G09G 3/3208* (2016.01)
*G09G 3/36* (2006.01)

(52) U.S. Cl.
CPC ......... *G06F 1/1688* (2013.01); *G09G 3/3208* (2013.01); *G09G 3/36* (2013.01); *G09G 2300/04* (2013.01)

(58) Field of Classification Search
CPC ........ G06F 1/1686; G06F 1/1688; G09F 9/30; H05B 33/06; H10K 50/00; H10K 59/00
See application file for complete search history.

(56) References Cited

U.S. PATENT DOCUMENTS

| | | | |
|---|---|---|---|
| 6,137,526 A | 10/2000 | Kakii | |
| 6,674,424 B1 | 1/2004 | Fujioka | |
| 8,674,959 B2 | 3/2014 | Corrion | |
| 8,684,613 B2 | 4/2014 | Weber | |
| 8,866,989 B2 | 10/2014 | Mathew et al. | |
| 9,690,024 B2 | 6/2017 | Jiao et al. | |
| 10,573,226 B1 | 2/2020 | Ma et al. | |
| 10,607,573 B2* | 3/2020 | Silvanto | G06F 1/1686 |
| 10,627,864 B2 | 4/2020 | Bao et al. | |
| 10,650,723 B2 | 5/2020 | Wu | |
| 10,838,468 B2 | 11/2020 | Bikumala et al. | |
| 11,521,577 B2* | 12/2022 | Silvanto | G09G 5/14 |
| 11,521,579 B2* | 12/2022 | Silvanto | G09G 5/14 |
| 11,823,645 B2* | 11/2023 | Silvanto | G06F 1/1688 |
| 2001/0014006 A1 | 8/2001 | Kim et al. | |
| 2003/0193599 A1 | 10/2003 | Campbell et al. | |
| 2004/0212555 A1* | 10/2004 | Falco | G06F 1/1637 345/50 |
| 2005/0014527 A1 | 1/2005 | Chambers et al. | |
| 2005/0130680 A1 | 6/2005 | Northcutt | |
| 2005/0264689 A1 | 12/2005 | Yang et al. | |
| 2006/0001630 A1 | 1/2006 | Chen et al. | |
| 2006/0010403 A1 | 1/2006 | Jeon | |
| 2006/0279652 A1 | 12/2006 | Yang et al. | |
| 2007/0002035 A1 | 1/2007 | Plut | |
| 2008/0080850 A1 | 4/2008 | Amirzadeh et al. | |
| 2009/0051636 A1 | 2/2009 | Natori | |
| 2009/0189835 A1 | 7/2009 | Kim et al. | |
| 2009/0231310 A1 | 9/2009 | Tsai et al. | |
| 2009/0249247 A1 | 10/2009 | Tseng et al. | |
| 2010/0039530 A1 | 2/2010 | Guo et al. | |
| 2010/0060842 A1 | 3/2010 | Igeta et al. | |
| 2010/0156945 A1 | 6/2010 | Yoshida | |
| 2011/0018849 A1 | 1/2011 | Lowe et al. | |
| 2011/0043487 A1 | 2/2011 | Huang et al. | |
| 2011/0063550 A1 | 3/2011 | Gettemy et al. | |
| 2011/0117532 A1 | 5/2011 | Relyea et al. | |
| 2011/0182443 A1 | 7/2011 | Gant | |
| 2011/0316807 A1* | 12/2011 | Corrion | G06F 3/0412 345/173 |
| 2012/0069241 A1 | 3/2012 | Shiau et al. | |
| 2012/0070145 A1 | 3/2012 | Wong et al. | |
| 2012/0105400 A1 | 5/2012 | Mathew et al. | |
| 2012/0106063 A1 | 5/2012 | Mathew et al. | |
| 2012/0243091 A1 | 9/2012 | Amm et al. | |
| 2012/0243719 A1 | 9/2012 | Franklin et al. | |
| 2013/0063978 A1 | 3/2013 | Gettemy et al. | |
| 2013/0094126 A1 | 4/2013 | Rappoport et al. | |
| 2013/0169734 A1 | 7/2013 | Lee et al. | |
| 2013/0176283 A1 | 7/2013 | Nakata | |
| 2013/0250202 A1 | 9/2013 | Qi et al. | |
| 2013/0328051 A1 | 12/2013 | Franklin et al. | |
| 2014/0204303 A1 | 7/2014 | Koide | |
| 2014/0218602 A1 | 8/2014 | Kim et al. | |
| 2014/0225131 A1 | 8/2014 | Benson et al. | |
| 2016/0011104 A1 | 4/2016 | Kim et al. | |
| 2016/0111040 A1* | 4/2016 | Kim | G09G 3/2096 257/773 |
| 2016/0202515 A1 | 7/2016 | Watanabe et al. | |
| 2016/0231610 A1 | 8/2016 | Son et al. | |
| 2017/0084231 A1* | 3/2017 | Chew | G09G 3/20 |
| 2017/0160766 A1 | 6/2017 | Gupta et al. | |
| 2022/0155831 A1 | 5/2022 | Sun et al. | |

FOREIGN PATENT DOCUMENTS

| | | |
|---|---|---|
| CN | 204167325 U | 2/2015 |
| EP | 2611146 A1 | 3/2013 |
| EP | 2667236 A1 | 11/2013 |
| JP | H10333158 A | 12/1998 |
| JP | 2002-014366 | 1/2002 |
| JP | 2003-163759 | 6/2003 |
| JP | 2005304051 A | 10/2005 |
| JP | 2006171680 A | 6/2006 |
| JP | 2006-311358 A | 11/2006 |
| JP | 2007150502 A | 6/2007 |
| JP | 2007316243 A | 12/2007 |
| JP | 2008-245231 | 10/2008 |
| JP | 2009047902 A | 3/2009 |
| JP | 2010015015 A | 1/2010 |
| JP | 2010029405 A | 2/2010 |
| JP | 2010072363 A | 4/2010 |
| JP | 2010134683 A | 6/2010 |
| JP | 2012070356 A | 4/2012 |
| JP | 2012098726 A | 5/2012 |
| JP | 2012-216030 A | 11/2012 |
| JP | 2012242465 A | 12/2012 |
| JP | 2013101369 A | 5/2013 |
| JP | 2013225033 A | 10/2013 |
| JP | 2014134766 A | 7/2014 |
| JP | 2014-142851 A | 8/2014 |
| JP | 2014197203 A | 10/2014 |
| JP | 2015151286 A | 8/2015 |
| KR | 20040093018 A | 11/2004 |
| KR | 20130000901 A | 1/2013 |
| KR | 10-20130027335 A | 3/2013 |
| KR | 20160000817 A | 1/2016 |
| WO | 2009027773 A1 | 3/2009 |
| WO | 2013184344 A1 | 12/2013 |
| WO | 2014141893 A1 | 9/2014 |
| WO | 2014142183 A1 | 9/2014 |
| WO | 2015022887 A1 | 2/2015 |
| WO | 2015029704 A1 | 3/2015 |

* cited by examiner

ELECTRONIC DEVICE DISPLAY WITH EXTENDED ACTIVE AREA

This application is a continuation of U.S. patent application Ser. No. 17/971,260, filed Oct. 21, 2022, which is a continuation of U.S. patent application Ser. No. 17/710,687, filed Mar. 31, 2022, now U.S. Pat. No. 11,521,579, which is a continuation of U.S. patent application Ser. No. 16/831,577, filed Mar. 26, 2020, now U.S. Pat. No. 11,521,577, which is a continuation of U.S. patent application Ser. No. 15/759,054, filed Mar. 9, 2018, now U.S. Pat. No. 10,607,573, which is a national stage application filed under 35 U.S.C. § 371 of international patent application No. PCT/US2016/048754, filed Aug. 25, 2016, which claims priority to U.S. provisional patent application No. 62/233,923, filed Sep. 28, 2015, all of which are hereby incorporated by reference herein in their entireties.

FIELD

This relates generally to electronic devices, and more particularly, to electronic devices with displays.

BACKGROUND

Electronic devices often include displays. For example, cellular telephones, tablet computers, and laptop computers include displays for presenting information to users.

The active area of a display contains pixels that display images. Display driver circuits, buttons, cameras, and other components that do not emit light are located in an inactive border region that surrounds the active area.

If care is not taken, the size of the border of a display may be larger than desired. For example, when a component such as a camera or button is located along the border of a display, the border may need to be enlarged to accommodate the camera or button. This can restrict the amount of display area that is available for presenting visual information to a user.

SUMMARY

An electronic device may be provided with a display. The display may be formed from liquid crystal display pixels, organic light-emitting diode pixels, or other pixels. The display may have an active area that is bordered by an inactive area. The active area contains pixels and displays images. The inactive area does not contain any pixels and does not display images.

The inactive area may have a layer of black ink or other masking material to block internal components from view. The active area may have an opening that contains an isolated inactive area region or may contain a notch or other recess into which a portion of the inactive area protrudes. An electrical component such as a speaker, camera, light-emitting diode, light sensor, proximity sensor, strain gauge, magnetic sensor, pressure sensor, force sensor, temperature sensor, or other sensor, button, touch-sensitive component, microphone or other audio component, or other electrical device that produces output and/or gathers input, may be mounted in a portion of the inactive area that protrudes into the recess or that is located in the opening of the active area.

The inactive area may have a main region such as a rectangular region that displays images and may have one or more extended regions that extend from the main region. The extended regions may, for example, include first and second elongated rectangular extended regions that lie between the main rectangular region and the inactive border. The first and second extended regions may be located on opposing sides of a camera or other electrical component in a protruding portion or island-shaped portion of the inactive region. Icons or other information may be displayed on a black background in the extended regions, giving the display a continuous unbroken appearance.

Further features will be more apparent from the accompanying drawings and the following detailed description.

DETAILED DESCRIPTION

Electronic devices may include displays. The displays may be used to display images for a user. Illustrative electronic devices that may be provided with displays are shown in FIGS. 1, 2, 3, and 4.

Figure 1:
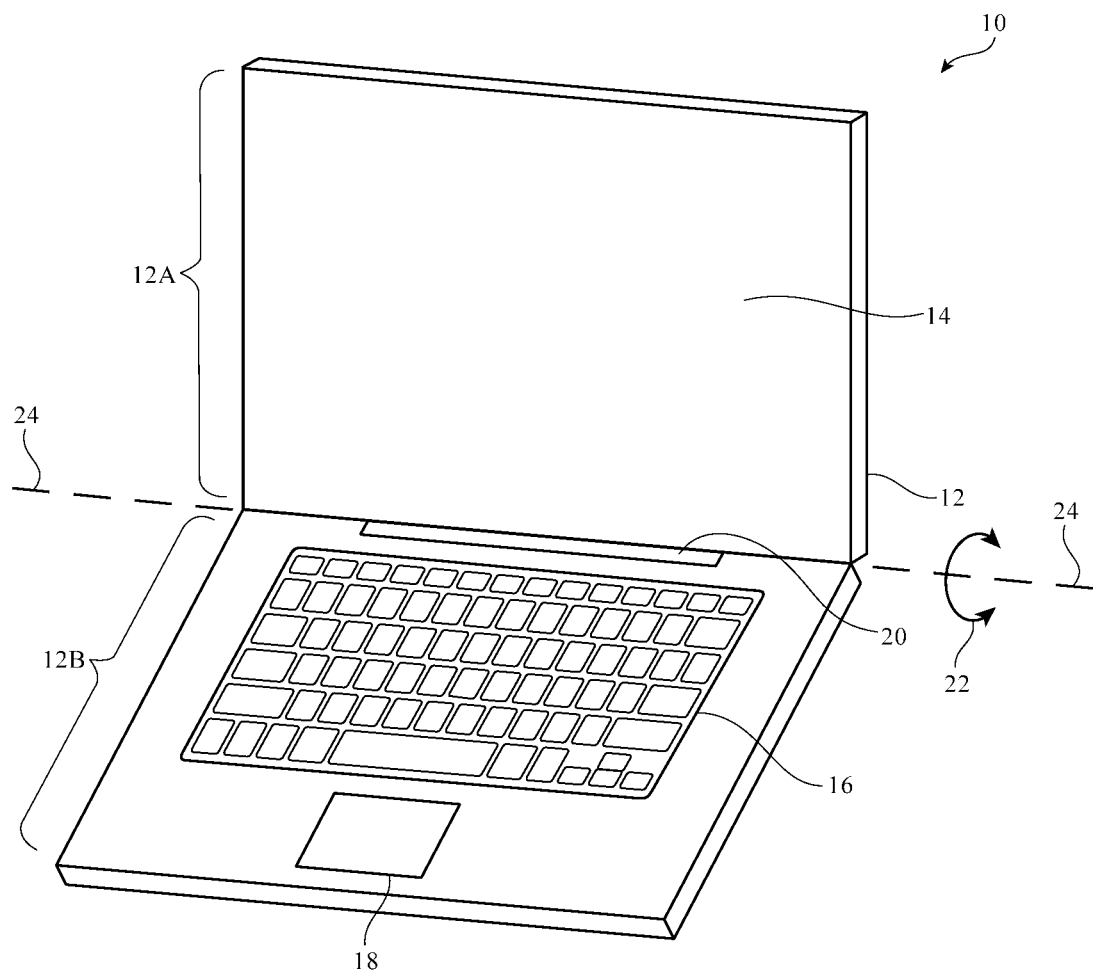
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
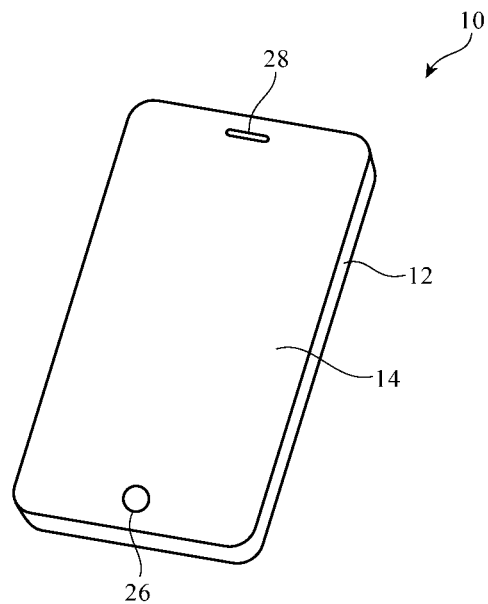
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
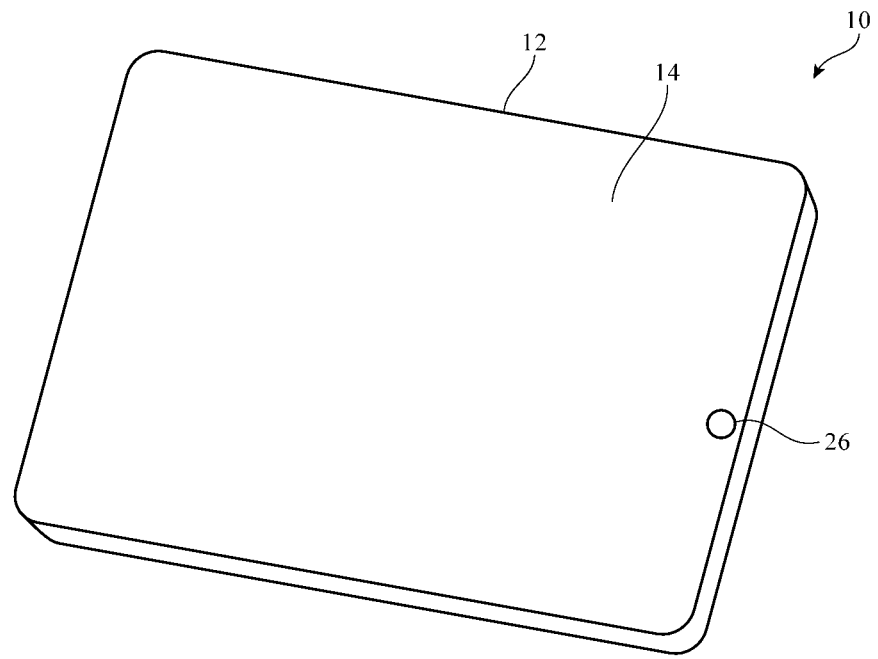
FIG. 3 is a perspective view of an illustrative electronic device such as a tablet computer, watch, or other portable device with a display in accordance with an embodiment.

FIG. 3 shows how electronic device 10 may be a tablet computer, watch, or other portable device. In electronic device 10 of FIG. 3, housing 12 may have opposing planar front and rear surfaces. Display 14 may be mounted on the front surface of housing 12. As shown in FIG. 3, display 14 may have an opening to accommodate button 26. If desired, button 26 may be omitted.

Figure 4:
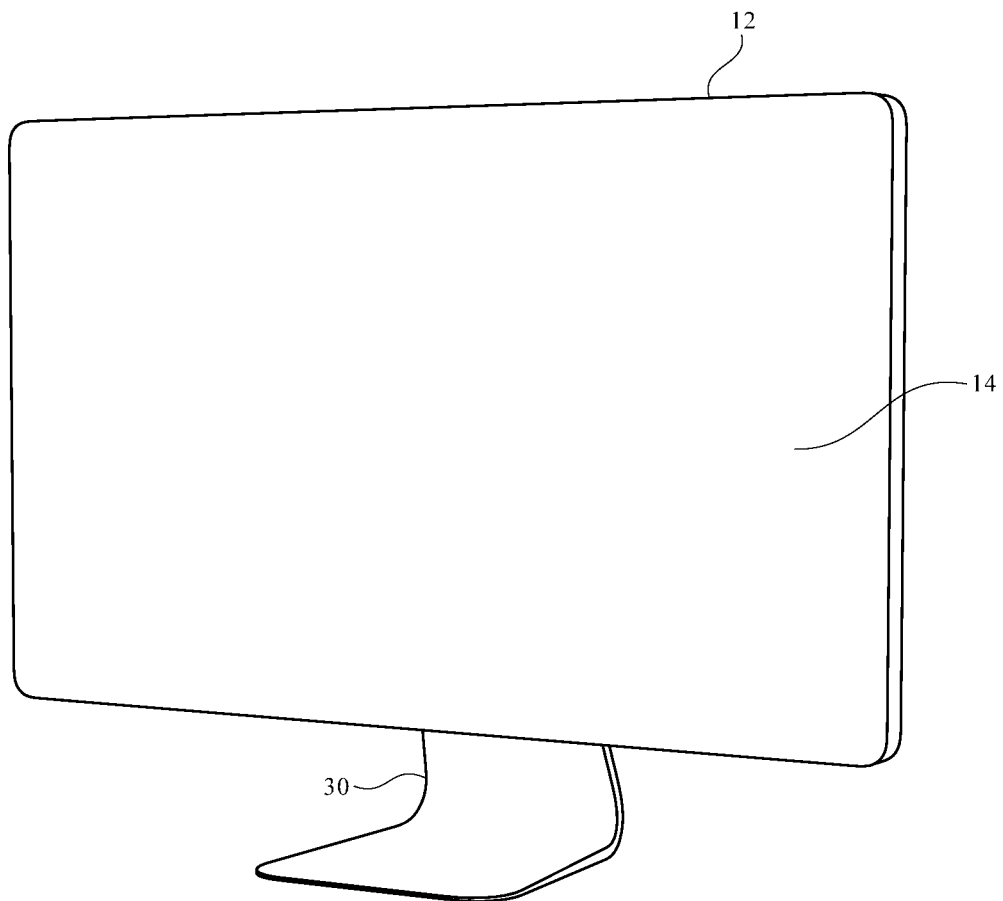
FIG. 4 is a perspective view of an illustrative electronic device such as a computer display with display structures in accordance with an embodiment.

FIG. 4 shows how electronic device 10 may be a display such as a display with an embedded computer, a display without an embedded computer, or other suitable equipment for displaying images. With this type of arrangement, housing 12 for device 10 may be mounted on a support structure such as stand 30 or stand 30 may be omitted (e.g., to mount device 10 on a wall). Display 14 may be mounted on a front face of housing 12.

The illustrative configurations for device 10 that are shown in FIGS. 1, 2, 3, and 4 are merely illustrative. The outline of display 14 may be rectangular, oval, circular, or other suitable shape. In general, electronic device 10 may be a laptop computer, a computer monitor or other display containing an embedded computer, a tablet computer, a cellular telephone, a media player, or other handheld or portable electronic device, a smaller device such as a wristwatch device, a pendant device, a headphone or earpiece device, or other wearable or miniature device, a computer display or other monitor that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may be a liquid crystal display, an organic light-emitting diode display, a plasma display, an electrophoretic display, an electrowetting display, a display formed from an array of crystalline semiconductor light-emitting diode dies, or a display formed from other types of pixels. A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

The layers of material that make up display 14 may be mounted in chassis structures such as a plastic chassis structure and/or a metal chassis structure to form a display module for mounting in housing 12 and/or the layers of display 14 may be mounted directly in housing 12 (e.g., by stacking display layers into a recessed portion of housing 12).

Display 14 may have a rectangular shape (i.e., display 14 may have a rectangular footprint and a rectangular peripheral edge that runs around the rectangular footprint), may have an oval or circular footprint, or may have other shapes with curved and/or straight edges. Display 14 may be planar or may have a curved profile. To help accommodate electrical components along the edges of display 14 without overly reducing the size of the footprint of display 14, the edges of active area of display 14 may be provided with locally recessed portions such as notches and/or display 14 may be provided with isolated inactive areas in which electrical components can be mounted.

Figure 5:
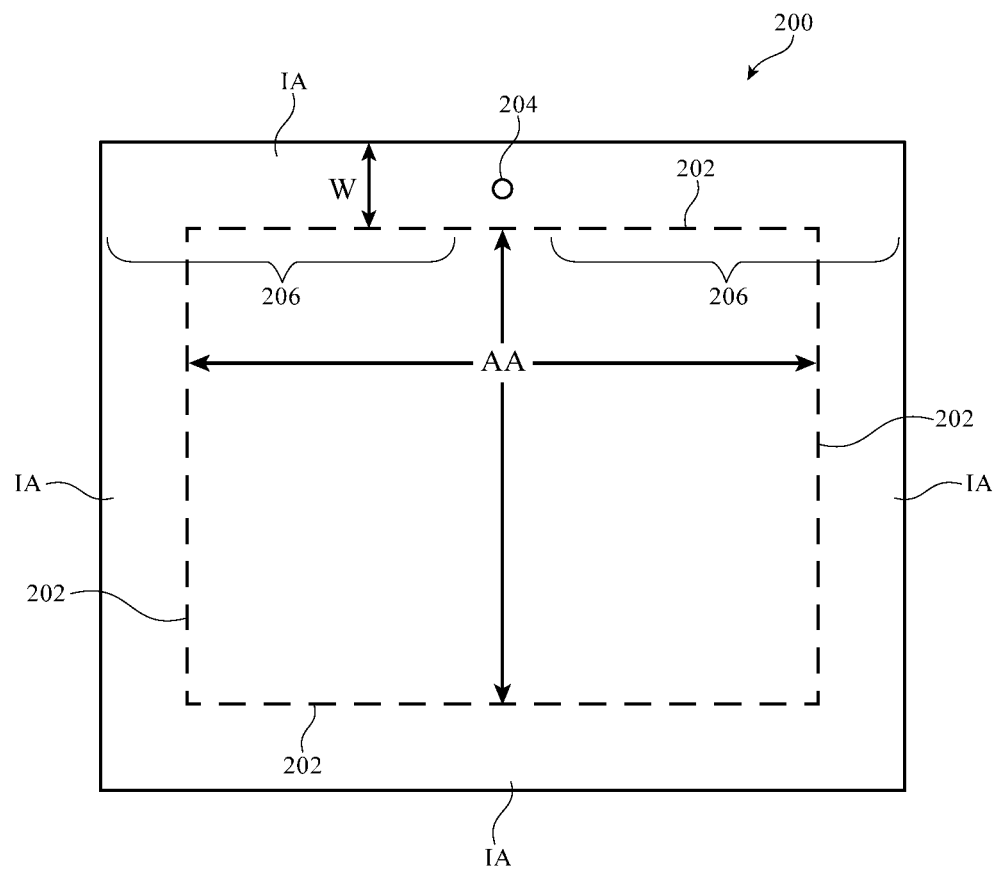
FIG. 5 is a diagram of a conventional display.

A top view of a conventional display is shown in FIG. 5. Display 200 of FIG. 5 has a rectangular active area AA with four straight edges 202. A rectangular ring-shaped inactive area IA surrounds active area AA. The width W of the upper strip of inactive area IA is sufficiently wide to accommodate camera 204. However, the width W of this upper strip of inactive area IA is larger than necessary in regions such as regions 206 of the upper strip of inactive area that do not contain camera 204. This leads to wasted space.

Figure 6:
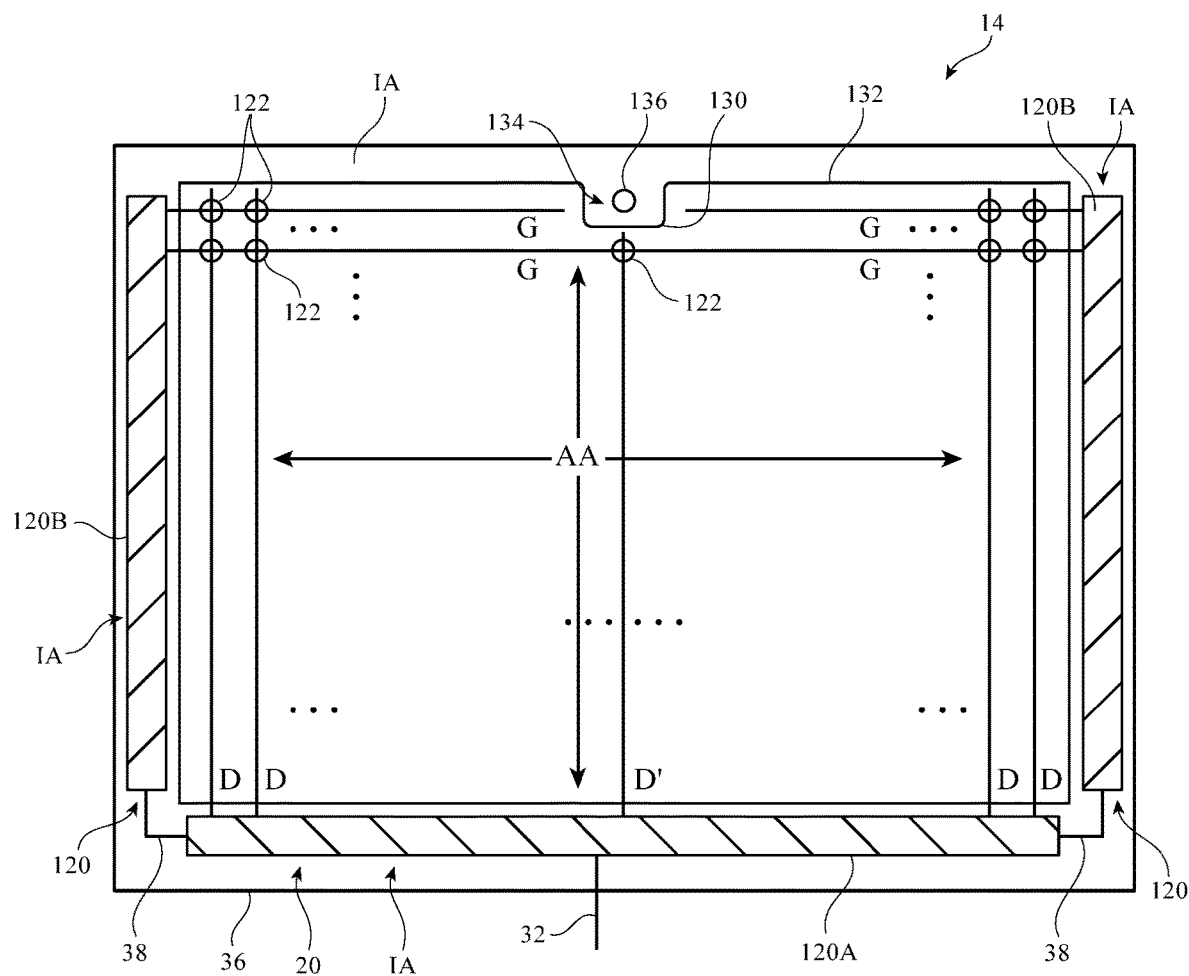
FIG. 6 is a diagram of an illustrative display in accordance with an embodiment.

A top view of an illustrative display with a recessed portion along one of the edges of its active area is shown in FIG. 6. As shown in FIG. 6, display 14 may have an array of pixels 122 formed from layers of material on a substrate such as substrate 36. Substrates such as substrate 36 may be formed from glass, metal, plastic, ceramic, or other substrate materials. Pixels 122 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 122 in display 14 (e.g., tens or more, hundreds or more, or thousands or more).

Display 14 may be formed from an array of discrete light-emitting diodes, from electrowetting pixel structures, from electrophoretic pixel structures, or from other suitable display structures. In organic light-emitting diode displays, pixels 122 contain respective organic light-emitting diodes and pixel circuits that control the application of current to the light-emitting diodes. In liquid crystal displays, pixels 122 contain pixel circuits that control the application of signals to pixel electrodes that are used for applying controlled amounts of electric field to pixel-sized portions of a liquid crystal layer. The pixel circuits in pixels 122 may contain transistors having gates that are controlled by control signals such as gate line signals on gate lines G.

Display driver circuitry 120 may be used to control the operation of pixels 122. Display driver circuitry 120 may be formed from integrated circuits, thin-film transistor circuits, or other suitable circuitry. Thin-film transistor circuitry may be formed from polysilicon thin-film transistors, semiconducting-oxide thin-film transistors such as indium gallium zinc oxide transistors, or thin-film transistors formed from other semiconductors. Pixels 122 may have color filter elements or other colored structures of different colors (e.g., red, green, and blue) to provide display 14 with the ability to display color images.

Display driver circuitry 120 may include display driver circuits such as display driver circuitry 120A and gate driver circuitry 120B. Display driver circuitry 120A may be formed from one or more display driver integrated circuits and/or thin-film transistor circuitry (e.g., timing controller integrated circuits). Gate driver circuitry 120B may be formed from gate driver integrated circuits or may be thin-film "gate-on-array" circuitry. Display driver circuitry 120A of FIG. 6 may contain communications circuitry for communicating with system control circuitry in device 10. This control circuitry may include microprocessors, application-specific integrated circuits, memory, and other storage and processing circuitry for generating images to display on display 14. The control circuitry of device 10 may communicate with display driver circuitry 120A over path 32. Path 32 may be formed from traces on a flexible printed circuit or other conductive lines. During operation, the control circuitry of device 10 may supply circuitry 120A with information on images to be displayed on pixels 122 of active area AA of display 14.

To display the images on display pixels 122, display driver circuitry 120A may supply image data to data lines D while issuing control signals to supporting display driver circuitry such as gate driver circuitry 120B over paths such as paths 38. Path 38 may, for example, include lines for carrying power signals, control signals such as output enable signals, clock signals, etc. Circuitry 120A may supply these signals to gate driver circuitry 120B. Circuitry 120B may be located on one edge of display 14, on opposing left and right edges of display 14, or elsewhere in display 14.

Gate driver circuitry 120B (sometimes referred to as horizontal control line control circuitry) may control horizontal control lines (gate lines) G using the signals received from path 38 (e.g., power signals, output enable signals, clock signals, etc.). Gate lines G in display 14 may each carry a gate line signal or other signal or signals for controlling the pixels 122 of a respective row (e.g., to turn on transistors in pixels 122 when loading data from the data lines into pixel storage capacitors in those pixels from data lines D). During operation, frames of image data may be displayed by asserting a gate signal on each gate line G in the display in sequence. Shift register circuitry (e.g., a chain of registers) in gate driver circuitry 120B may be used in controlling the gate line signals.

Display 14 has an active area AA that contains pixels 122 and that displays images. Display 14 may also have an inactive area IA (sometimes referred to as a border region) that contains display driver circuitry 120 and other components that do not produce images. In some configurations, the underside of a display cover layer for display 14 or other layer of display 14 may contain opaque masking material (e.g., a layer of black or white ink, etc.) to hide display driver circuitry and other components in inactive area IA from view from the exterior of device 10. Windows may also be formed in the inactive area of display 14 (e.g., to accommodate image sensors, to accommodate ambient light sensors, proximity sensors, etc.).

In display 14 of FIG. 6, active area AA has a generally rectangular shape with upper and lower edges and left and right edges. Inactive area IA may have four generally strip-shaped edge regions (e.g., display 14 may have a rectangular ring-shaped inactive border made up of upper and lower inactive area strips and left and right inactive area strips). To accommodate components in inactive area IA without overly enlarging inactive area IA (and thereby overly reducing the size of active area AA), active area AA may be provided with one or more recesses or isolated openings into which part of inactive area IA may extend. For example, a notch may be formed in active area AA and a portion of inactive area IA may protrude into the notch. This protruding portion of the inactive area may be used to accommodate a component such as a button, fingerprint reader, light-emitting diode status indicator, ambient light sensor, proximity sensor, touch sensor, camera (i.e., a digital image sensor), strain gauge, magnetic sensor, pressure sensor, force sensor, temperature sensor, or other sensor, button, touch-sensitive component, microphone or other audio component, or other electrical component(s) that produces output and/or receives input.

In the configuration of FIG. 6, for example, active area AA of display 14 may have an upper edge such as edge 132. A recess such as recessed portion 130 may be formed in edge 132. Recessed portion 130 creates an associated enlarged inwardly protruding region 134 of inactive area IA. Extended inactive areas such as inactive area IA in region 134 may be contiguous with other portions of inactive area IA or may be formed as isolated islands of inactive area IA that are surrounded by active area AA. In the example of FIG. 6, inactive area IA in inwardly protruding area 134 is contiguous with the horizontal upper strip of inactive area IA that forms the top border region of display 14.

Due to the presence of inactive area protrusion 134, there is room in display 14 for a component such as component 136. Component 136 may be a sensor, a light detecting device, an output device, a button, a fingerprint reader, an image sensor, or other suitable device. As an example, component 136 may be an image sensor (camera) that is mounted behind a camera window. The camera window may include an opening in a black ink layer and/or unpolarized regions of otherwise polarized layer(s) in the layers of material forming display 14. Other light-based components (e.g., light sensors, light-emitting devices such as one or more discrete visible-light or infrared light-emitting diodes, light-based proximity sensors, etc.) may also be mounted under a window in region 134 of inactive area IA. The use of a camera in region 134 is merely illustrative.

Because region 134 protrudes inwardly into active area AA, the gate lines G (or other horizontal control lines) that would otherwise traverse region 134 may be truncated, as shown in FIG. 6. In general, data lines D, control lines such as gate lines G, and/or both data lines and control lines may be routed in a way that accommodates extended inactive area 134. In the example of FIG. 6, shortened gate lines G allow extended portions of active area AA to be present on the left and right sides of inactive region 134. It is therefore not necessary to eliminate entire rows of pixels 122 along the upper edge of active area AA to accommodate component 136. This maximizes the area consumed by active area AA.

In the example of FIG. 6, gate lines G include regular length lines that extend from gate driver circuitry 120B at the left and right edge of display 14 to the middle of display 14. Gate lines G also include shortened lines. The shortened lines extend from gate driver circuitry 120B at the left and right edges of display 14 towards the middle of display 14 as with the regular length lines, but terminate at the edge of inactive area protrusion 134 so as not to intrude into protrusion 134. Data lines D likewise include regular length lines that extend the full vertical extent of display 14 and shortened data lines such as data line D' that terminate at the edge of protrusion 134.

Figure 7:
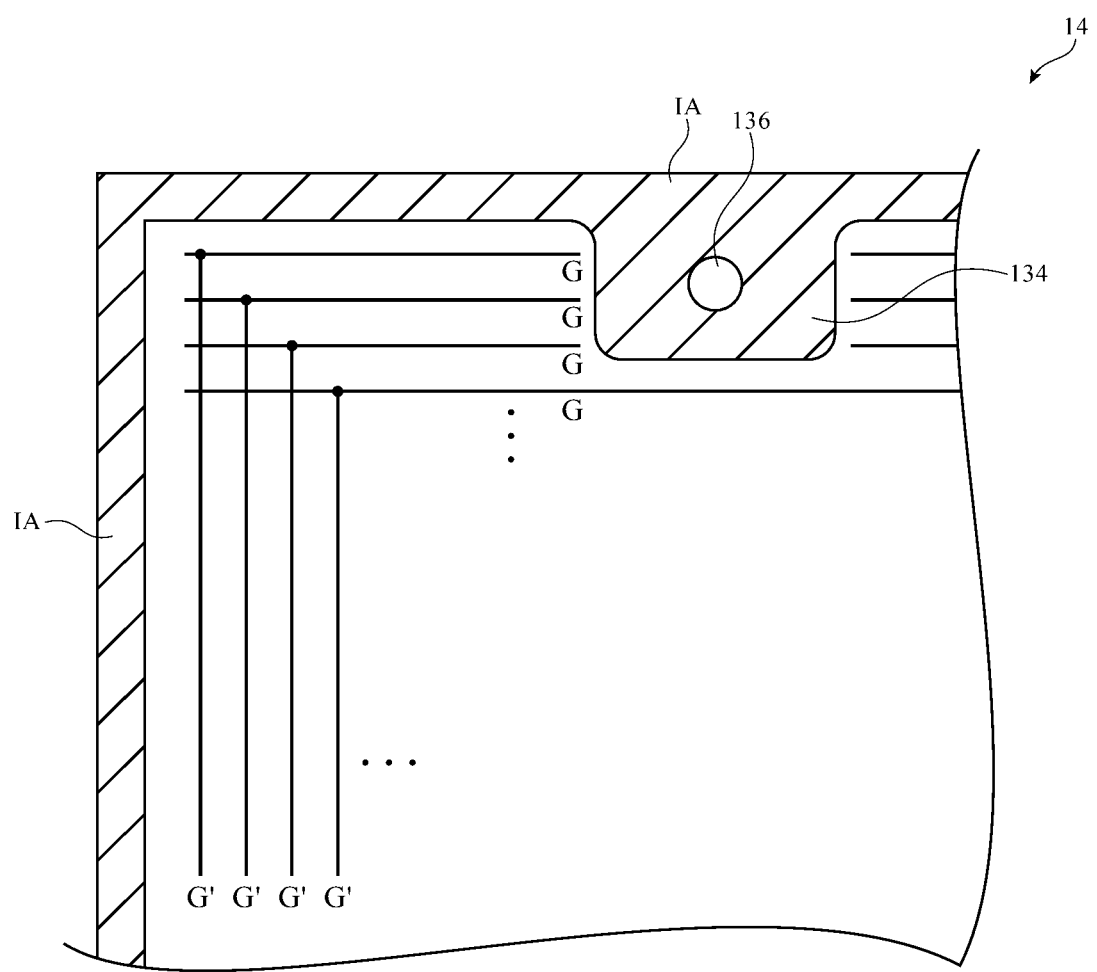
FIG. 7 is a diagram of a portion of an illustrative display in accordance with an embodiment.
Figure 8:
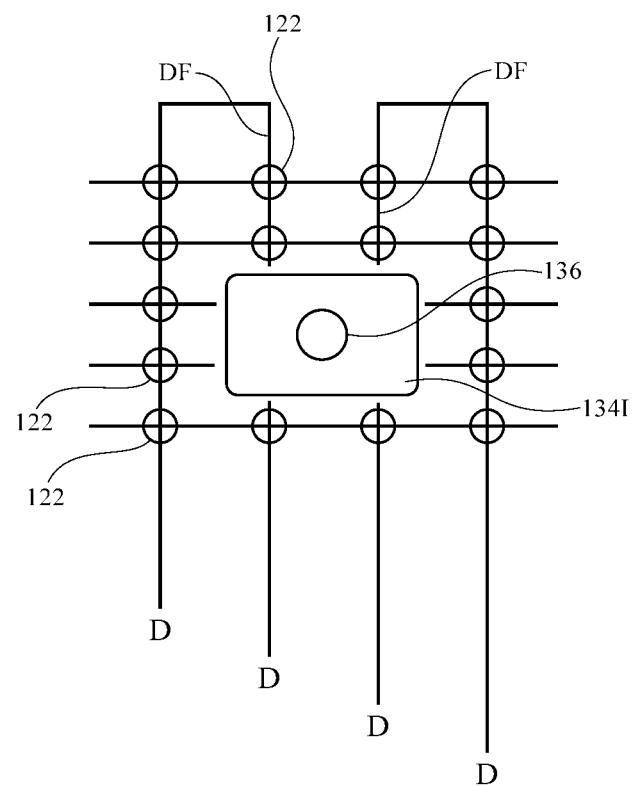
FIG. 8 is a diagram showing how an inactive area of a display may have the shape of an island surrounded by active area in accordance with an embodiment.

If desired, other data line and gate line layouts may be used to route signals to pixels 122 without intruding on inactive areas such as protrusion 134. For example, the illustrative arrangement of FIG. 7 shows how gate line signals may be routed vertically to horizontal gate lines G using vertical gate line extensions G'. Gate line extensions G' may each be coupled to gate driver circuitry located along the lower edge of display 14 (as an example). This layout, which reduces or eliminates the need for gate driver circuitry along the left and right edges of display 14, allows boarders such as the left-hand border region (inactive area IA) for display 14 to be reduced in size. In the illustrative configuration of FIG. 8, data lines D have folded over end portions DF that allow data lines D to load data into pixels 122 that would otherwise be blocked due to the presence of an island of inactive area IA such as island 134I or other isolated inactive area. If desired, display driver circuitry may be located in blocks both above and below islands such as island 134I (in which case data lines can extend directly to pixels 122 from the respective blocks without folding). Other arrangements for routing control line signals, data line signals, and power signals may be used to accommodate inward protrusions of inactive area (i.e., active area notches or other recesses) and/or islands of inactive area surrounded by active area (i.e., inactive area formed in isolated openings in the active area). The configurations of FIGS. 6, 7, and 8 are merely illustrative.

The extended inactive area regions of display 14 may make it difficult or impossible to display a perfect rectangle of image content on display 14. Nevertheless, the enhanced amount of active area that is present in display 14 can be put to use in displaying other information for a user.

Figure 9:
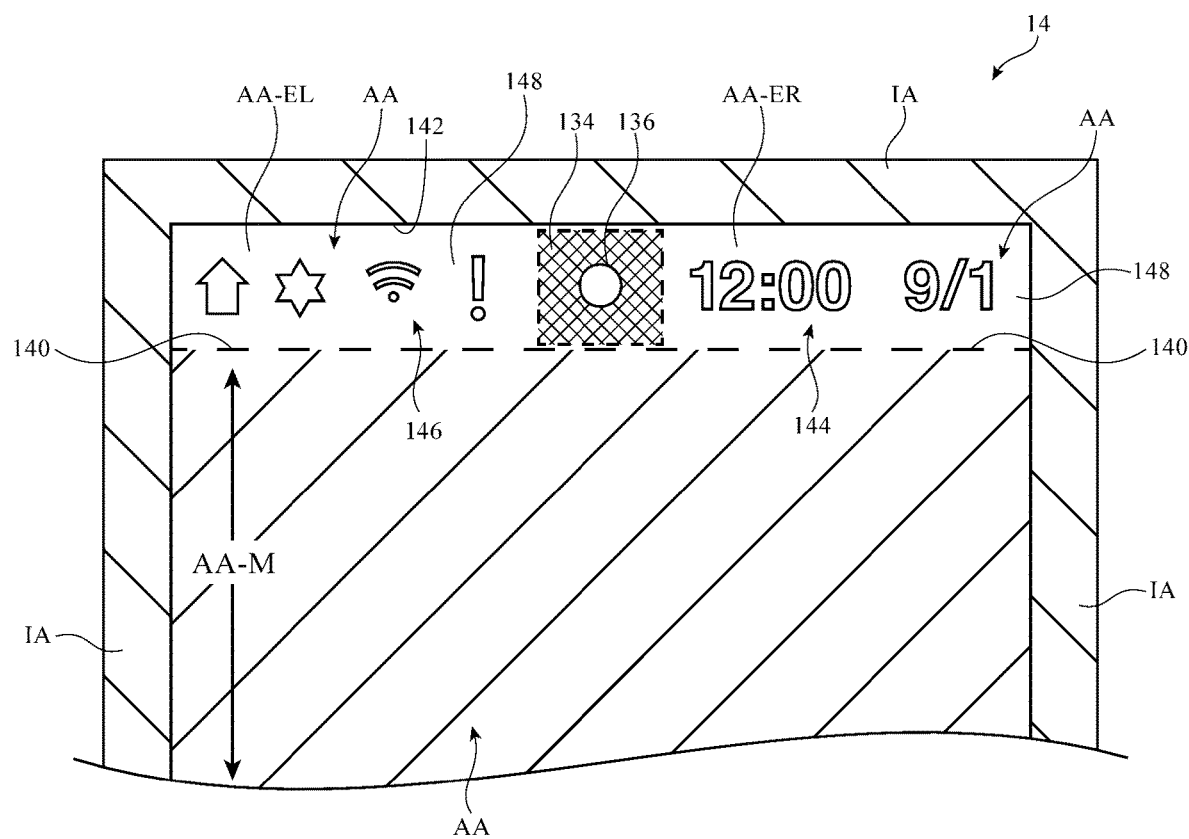
FIG. 9 is a diagram of an illustrative display in which an edge region of the display contains an inactive area protrusion that extends into a notch in an active area and contains a pair of extended active area regions on opposing sides of the inactive area protrusion in which icons and other information may be displayed in accordance with an embodiment.

With one illustrative approach, which is illustrated in FIG. 9, a portion of active area AA (i.e., a main rectangular portion of active area AA such as main portion AA-M) may be used in displaying a rectangular portion of content for the user. Rectangular main portion AA-M of display 14 may, for example, be used to display a rectangular picture, a rectangular video, a rectangular document containing text and/or graphics, or other rectangular content. Due to the presence of inactive area protrusion 134, horizontal upper edge 140 of portion AA-M cannot be extended farther upward without altering its shape. Nevertheless, extended active area regions AA-EL and AA-ER are available to the left and right of region 134. Regions AA-EL and AA-ER may be elongated rectangular regions (i.e., strip-shaped regions that extend horizontally). Region AA-EL lies between edge 140 of active area region AA-M and inner edge 142 of the portion of inactive area IA that extends along the upper edge of display 14. Region AA-ER lies between edge 140 of active area region AA-M and inner edge 142.

Regions such as extended regions AA-EL and AA-ER may be used to display content such as text, graphics, video, pictures, etc. For example, regions AA-EL and AA-ER may be used to display information such as time and data information 144 and icons 146. This information may relate to the general status of device 10 and/or may be related to the content being displayed in area AA-M. For example, information in regions AA-EL and AA-ER may contain status bar information such as battery charge level, wireless local area network signal strength information, network connectivity information, time information, date information, message status information, display brightness information, media playback status information, etc. If desired, information in regions AA-EL and AA-ER may relate to a document being displayed in region AA-M. For example, page count information, word count information, document magnification status, line spacing settings, and other status information on a document may be presented. In situations in which region AA-M is displaying a video, regions AA-EL and AA-ER may display running time information, time remaining information, playback volume information, media title information, etc.

Information 144 and 146 may be presented on a background such as background 148. Background 148 may have any suitable color and/or pattern. If desired, inactive area IA may include a layer of black ink or other opaque masking material to hide internal components under the outermost layer(s) of display 14 from view. In this type of arrangement, background 148 may be black to match the black color of the inactive area masking material. Region 134 may also be black (e.g., the underside of the display layer(s) in region 134 may be coated with black ink) or region 134 may have a contrasting appearance (e.g., region 134 may be shiny, may be white, may be colored red or other suitable color, etc.). In configurations in which region background 148 is black to match the black color of region 134, regions AA-EL and AA-ER will have the appearance of being part of an integral strip of active area (and thereby an integral extensions of active area AA-M). The visual interruption from protrusion 134 will not be visually prominent because the black of region 134 will blend with the black of background 148.

Figure 10:
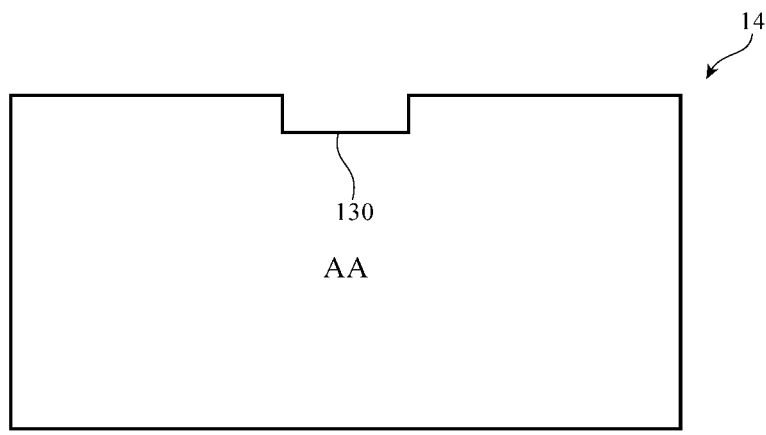
FIGS. 10, 11, 12, 13, and 14 are front views of displays having illustrative active area and inactive area patterns in accordance with embodiments.
Figure 11:
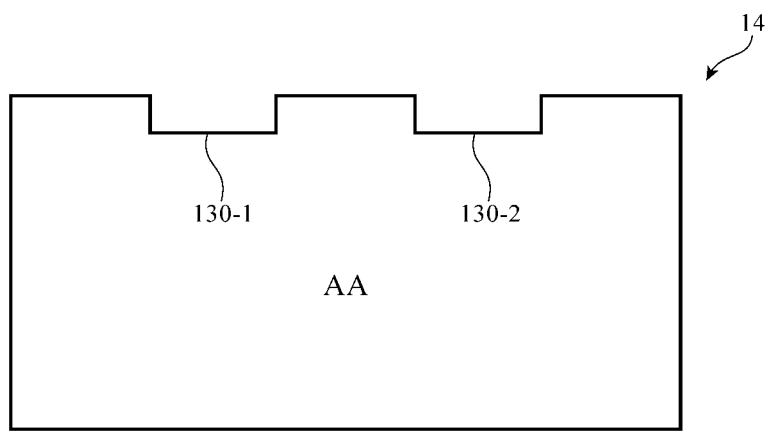
Figure 12:
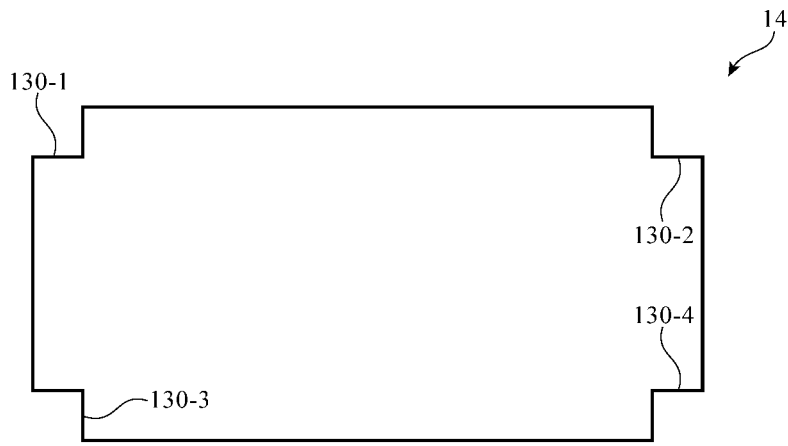
Figure 13:
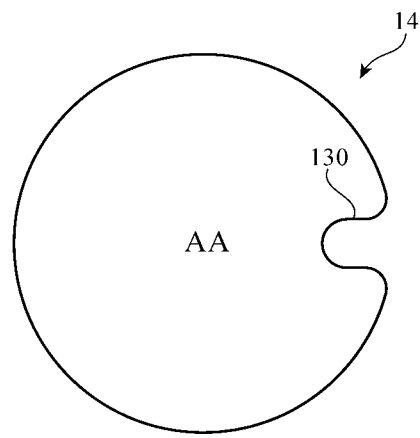
Figure 14:
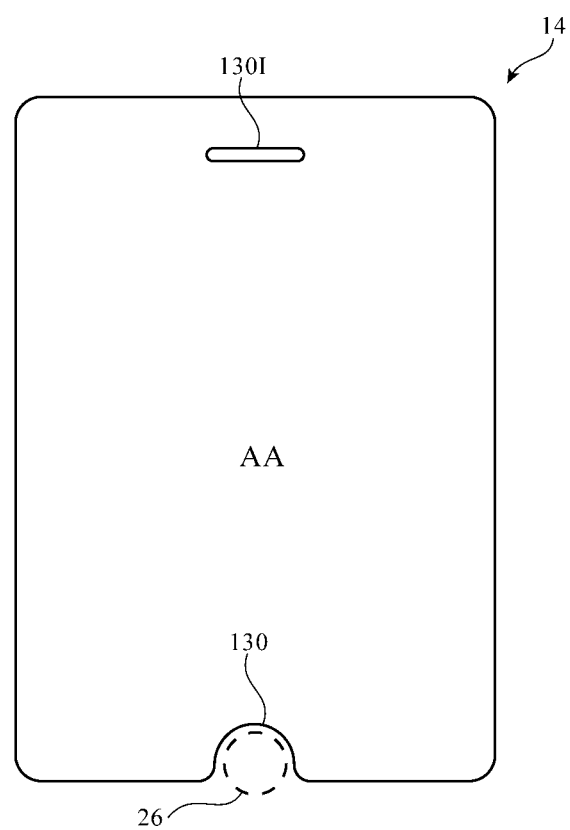

If desired, the active area AA of display 14 may have other shapes with islands of inactive area IA (i.e., openings in which inactive area IA has the shape of an isolated region surrounded by active area AA) and/or rectangular notches or other recesses. In the example of FIG. 10, active area AA of display 14 has a rectangular shape with a relatively shallow rectangular recess 130. FIG. 11 shows how there may be multiple recesses (e.g., recesses such as rectangular recesses 130-1 and 130-2) in active area AA. In the FIG. 12 configuration, there are recesses in each of the four corners of active area AA (i.e., recesses 130-1, 130-2, 130-3, and 130-4). In FIG. 13, active area AA has a circular outline into which a smooth mousehole-shaped recess 130 has been formed. Rectangular active areas such as rectangular active area AA of FIG. 14 may also be provided with curved recesses. Recess 130 of FIG. 14 may, as an example, accommodate button 26. Openings in active area AA such as illustrative opening 130I of FIG. 14 may be used to accommodate speakers and/or other electrical components.

Inactive area portions such as protrusions 134 may extend into each of the openings and other recesses of FIGS. 10, 11, 12, 13, and 14. Moreover, other shapes and layouts for the active area AA and inactive area IA of display 14 may be used. The examples of FIGS. 10, 11, 12, 13, and 14 are merely illustrative.

In accordance with an embodiment, a display is provided that includes an active area containing pixels that displays images, and an inactive area without pixels that extends along at least a portion of one edge of the active area, a protruding portion of the inactive area extends into the active area along the portion of the edge.

In accordance with another embodiment, the active area includes a rectangular portion and two rectangular extended regions on opposing sides of the inactive area.

In accordance with another embodiment, the pixels in the active area are configured to display icons in the rectangular extended regions.

In accordance with another embodiment, the display includes a camera in the protruding portion.

In accordance with another embodiment, the display includes an electrical component in the protruding portion of the inactive area.

In accordance with another embodiment, the electrical component includes an image sensor.

In accordance with another embodiment, the protruding portion includes a rectangular portion of the inactive area.

In accordance with another embodiment, the protruding portion of the inactive area has a black masking layer and the active area includes at least one portion that is adjacent to the protruding portion that displays information on a black background.

In accordance with another embodiment, the active area has a rectangular shape and the protruding portion includes a rectangular portion of the inactive area.

In accordance with another embodiment, the active area has a circular shape.

In accordance with another embodiment, the active area has a rectangular shape and the protruding portion protrudes into at least one corner of the rectangular shape.

In accordance with an embodiment, a display is provided that includes an active area containing pixels that displays images, and an isolated inactive area without pixels that is formed in an opening in the active area and that does not display images.

In accordance with another embodiment, the display includes an electrical component in the isolated inactive area.

In accordance with another embodiment, the electrical component includes a component selected from the group consisting of a speaker, a camera, a light sensor, a discrete light-emitting diode, a proximity sensor, a strain gauge, a force sensor, a temperature sensor, a fingerprint sensor, a button, and a microphone.

In accordance with another embodiment, the pixels include liquid crystal display pixels.

In accordance with another embodiment, the pixels include organic light-emitting diode pixels.

In accordance with another embodiment, the active area includes data lines and at least some of the data lines have folded ends adjacent to the isolated inactive area.

In accordance with another embodiment, the active area has a recessed portion into which a protruding inactive area extends.

In accordance with an embodiment, a laptop computer is provided that includes a housing having a base and a lid that rotates relative to the base, a display supported by the lid, the display has an active area containing pixels that displays images and has an inactive area that runs along at least one edge of the active area and the active area has a recess and the inactive area has a protruding portion that extends into the recess, and a camera mounted in the protruding portion of the inactive area.

In accordance with another embodiment, the active area has a main rectangular region that displays images and has first and second rectangular extended regions between the main rectangular region and the inactive border and the first and second rectangular extended regions are on opposing sides of the camera.

In accordance with another embodiment, the first and second rectangular extended regions display icons on a black background while the main rectangular region displays a rectangular picture.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
a display having an array of pixels that forms an active area;
first and second islands of inactive area in the display, wherein the first and second islands of inactive area are each surrounded by the active area;
opaque masking material in the first and second islands of inactive area, wherein the array of pixels is configured to display a black strip that matches the opaque masking material and that extends across the first and second islands of inactive area; and
an optical component in the first island of inactive area.

2. The electronic device defined in claim 1 wherein the optical component comprises an infrared light-emitting diode.

3. The electronic device defined in claim 1 wherein the array of pixels is configured to display an icon on the black strip that conveys media playback information.

4. The electronic device defined in claim 1 wherein the opaque masking material has an opening in the first island of inactive area.

5. The electronic device defined in claim 4 wherein the opening is circular.

6. The electronic device defined in claim 1 further comprising a touch-sensitive component in the second island of inactive area.

7. The electronic device defined in claim 1 wherein the optical component comprises a visible light camera.

8. The electronic device defined in claim 1 wherein the display includes data lines and gate lines and wherein at least some of the gate lines are shortened to accommodate the first and second islands of inactive area.

9. The electronic device defined in claim 1 wherein the display includes data lines and gate lines and wherein at least some of the gate lines are routed around the first and second islands of inactive area.

10. The electronic device defined in claim 1 wherein the display comprises a polarized layer having an unpolarized region in the first island of inactive area.

11. An electronic device, comprising:
a display having an array of pixels including first and second groups of pixels separated by a gap;
opaque masking material in the gap, wherein the opaque masking material has an opening and wherein the first and second groups of pixels are configured to display at least one icon on a black background that surrounds the opening and that matches the opaque masking material; and
an optical component aligned with the opening.

12. The electronic device defined in claim 11 wherein the display includes data lines and gate lines and wherein at least some of the gate lines are shortened to accommodate the gap.

13. The electronic device defined in claim 11 wherein the display includes data lines and gate lines and wherein at least some of the gate lines are routed around the gap.

14. The electronic device defined in claim 11 wherein the display comprises a polarized layer having an unpolarized region aligned with the gap.

15. The electronic device defined in claim 11 wherein the at least one icon conveys media playback information.

16. An electronic device, comprising:
a display having an active area with an array of pixels and having an isolated inactive area without pixels that is surrounded by the active area;
an opaque masking material located in the isolated inactive area and having an opening, wherein the array of pixels is configured to display a black background on opposing sides of the opaque masking material such that the opaque masking material blends in with the black background; and
an optical component aligned with the opening.

17. The electronic device defined in claim 16 wherein the black background matches the opaque masking material.

18. The electronic device defined in claim 16 wherein the optical component is selected from the group consisting of: an infrared light-emitting diode, a light sensor, and a visible light camera.

19. The electronic device defined in claim 16 wherein the display includes data lines and gate lines and wherein at least some of the gate lines are shortened to accommodate the isolated inactive area.

20. The electronic device defined in claim 16 wherein the display includes data lines and gate lines and wherein at least some of the gate lines are routed around the isolated inactive area.

* * * * *